United States Patent
Stadler et al.

(10) Patent No.: US 12,480,220 B2
(45) Date of Patent: Nov. 25, 2025

(54) SILVER ELECTROLYTE FOR DEPOSITING DISPERSION SILVER LAYERS AND CONTACT SURFACES WITH DISPERSION SILVER LAYERS

(71) Applicants: Rosenberger Hochfrequenztechnik GmbH & Co. KG, Fridolfing (DE); Dr.-Ing. Max Schlötter GmbH & Co. KG, Geislingen/Steige (DE)

(72) Inventors: Andreas Stadler, Saaldorf-Surheim (DE); Robert Sottor, Frankfurt (DE); Reinhard Wagner, Seekirchen am Wallersee (AT); Christian Dandl, Fridolfing (DE); Sebastian Heitmüller, Deggingen (DE)

(73) Assignees: ROSENBERGER HOCHFREQENZTECHNIK GMBH & CO. KG, Fridolfing (DE); DR.-ING. MAX SCHLOTTER GMBH & CO. KG, Geislingen/Steige (DE)

( * ) Notice: Subject to any disclaimer, the term of this patent is extended or adjusted under 35 U.S.C. 154(b) by 0 days.

(21) Appl. No.: 17/251,258

(22) PCT Filed: Jun. 26, 2019

(86) PCT No.: PCT/DE2019/100597
§ 371 (c)(1),
(2) Date: Dec. 11, 2020

(87) PCT Pub. No.: WO2020/007408
PCT Pub. Date: Jan. 9, 2020

(65) Prior Publication Data
US 2021/0254231 A1    Aug. 19, 2021

(30) Foreign Application Priority Data
Jul. 5, 2018    (DE) .......................... 102018005348.3

(51) Int. Cl.
| | | |
|---|---|---|
| C25D 3/46 | (2006.01) |
| B32B 5/16 | (2006.01) |
| C25D 5/12 | (2006.01) |
| C25D 7/00 | (2006.01) |
| C25D 7/06 | (2006.01) |
| C25D 15/00 | (2006.01) |
| C25D 17/08 | (2006.01) |
| C25D 5/34 | (2006.01) |

(52) U.S. Cl.
CPC .................. *C25D 3/46* (2013.01); *B32B 5/16* (2013.01); *C25D 5/12* (2013.01); *C25D 7/00* (2013.01); *C25D 7/0614* (2013.01); *C25D 15/00* (2013.01); *C25D 17/08* (2013.01); *B32B 2264/10* (2013.01); *B32B 2264/102* (2013.01); *B32B 2264/1023* (2020.08); *B32B 2307/538* (2013.01); *B32B 2457/00* (2013.01); *C25D 5/34* (2013.01)

(58) Field of Classification Search
CPC ....................................................... C25D 3/46
See application file for complete search history.

(56) References Cited

U.S. PATENT DOCUMENTS

| | | | | |
|---|---|---|---|---|
| 3,446,716 A | * | 5/1969 | Joachim ................... | C25D 3/46 205/263 |
| 5,290,422 A | * | 3/1994 | Michelsen-Mohammadein ......... | C25D 15/02 205/109 |
| 6,635,166 B2 | * | 10/2003 | Saji ........................ | C25D 15/02 205/267 |
| 7,514,022 B2 | * | 4/2009 | Miyazawa ............. | C25D 15/02 205/148 |
| 2007/0275611 A1 | | 11/2007 | Rehbein et al. | |
| 2017/0009350 A1 | * | 1/2017 | Myllymaki .............. | C25D 5/50 |

FOREIGN PATENT DOCUMENTS

| | | | | |
|---|---|---|---|---|
| CH | 622032 | * | 3/1981 | ............. C25D 15/02 |
| CN | 105297095 A | | 2/2016 | |
| CN | 106367785 A | | 2/2017 | |
| DE | 1521025 A1 | | 9/1969 | |
| DE | 3328067 A1 | | 9/1969 | |
| DE | 2543082 A | | 3/1977 | |
| DE | 2543082 A1 | | 3/1977 | |
| DE | 4133466 A1 | | 5/1992 | |
| DE | 102008030988 B4 | | 4/2010 | |
| DE | 102015102453 A1 | | 8/2016 | |

(Continued)

OTHER PUBLICATIONS

English translation, FR 2825721,Gonzales, Dec. 13, 2002. (Year: 2002).*
English translation CH 622032 (Year: 1981).*
Rigou et al. "Silver based composite coatings with improved sliding wear behavior", Wear, 290-291, 2012, 61-65 (Year: 2012).*
English translation KR20150131346 (Year: 2015).*
English translation JPH0827589 (Year: 1996).*
International Search Report dated Jan. 17, 2020 from PCT/DE2019/100597.
Extended European Search Report of Application No. 23171227.4 Dated Jun. 21, 2023.
Decision of Rejection of Chinese Application No. 201980044371.0 Dated Feb. 26, 2024—English Translation also provided.

(Continued)

*Primary Examiner* — Stefanie S Wittenberg
(74) *Attorney, Agent, or Firm* — Lippes Mathias LLP

(57) ABSTRACT

The invention relates to a silver electrolyte for the deposition of silver layers on substrates, which comprises potassium silver cyanide, potassium cyanide with a content of at least 10 g/L, at least one grain refiner with a content of 0.2 to 10 g/L, at least one dispersant with a content of 1 to 10 g/L and at least one solid component with a content of 1 to 150 g/L, wherein the particles of the solid component have an average particle size ($d_{50}$) of 10 nm-100 μm. Furthermore, contact surfaces and methods for the deposition of such contact surfaces are shown and the use of the electrolyte according to the invention in strip electroplating.

11 Claims, No Drawings

(56) References Cited

FOREIGN PATENT DOCUMENTS

| | | | | |
|---|---|---|---|---|
| GB | 1534429 | * | 12/1978 | ............. C25D 15/02 |
| GB | 1534429 | A | 12/1978 | |
| JP | 2013124404 | A | 6/2013 | |
| KR | 20150131346 | A | 11/2015 | |
| WO | 9114808 | A1 | 10/1991 | |
| WO | 02101119 | A1 | 12/2002 | |
| WO | 2014144180 | A1 | 9/2014 | |

OTHER PUBLICATIONS

Korean 1st Offfice Action Application No. 10-2021-7001960 Dated: Apr. 26, 2024.
Korean Office Action for Application No. KR 10-2021-7001962 (Enlish Translation Included), Dated Jan. 23, 2025.
Korean Office Action for Application No. 10-2021-7001962.
European Office Action for Application No. 19745553.8 Dated Jul. 14, 2025.

* cited by examiner

SILVER ELECTROLYTE FOR DEPOSITING DISPERSION SILVER LAYERS AND CONTACT SURFACES WITH DISPERSION SILVER LAYERS

The invention relates to a silver electrolyte for depositing silver layers on substrates, a method for depositing a dispersion silver layer on a substrate, and contact surfaces, wherein an electrochemically deposited dispersion silver layer is disposed on a substrate. Furthermore, the invention relates to the use of contact surfaces for electrical contacts in connectors and the use of a silver electrolyte for coating a substrate by means of strip electroplating.

Silver is an extremely versatile material. Because of its ductility and softness, it can be processed in a variety of ways. Of all metals, silver is the best conductor of heat and electricity. This makes silver an interesting material for the electrical and electronics industry, for example for coating surfaces, especially contact surfaces. Connectors and plug contacts which have the lowest possible electrical contact resistance are used as interfaces for the transmission of high electrical currents, which is why silver coatings are often used for contact elements which are installed in such a connector and are responsible for the electrical contact when plugged in.

Silver electrolytes are used to coat substrates with silver and to produce contact surfaces. Silver electrolytes are various silver-containing solutions and dispersions which are used for the electrochemical, especially galvanic silvering of surfaces. Silver electrolyte solutions can comprise various other additives such as grain refiners, dispersants, brighteners or solid components.

For applications in the electrical and electronic sector, especially for plugs and connectors, the conductivity, contact resistance and coefficient of friction are particularly relevant. Especially with regard to the increasing electric mobility, an increased demand for silver coatings, especially electroplated silver coatings, can be expected.

In case two silver-coated surfaces are moved over each other, a high force is required for this, as insertion and extraction forces are involved. This shows the disadvantage of contacts with silver surfaces, as they have a relatively high friction coefficient, which leads to high insertion and withdrawal forces, especially with plug-in contacts. Due to the high coefficient of friction, silver surfaces are subject to wear, which greatly limits the number of possible mating cycles. In addition, there is the problem that silver surfaces tend to cold welding. However, the contact resistance of a system of two silver-coated surfaces is advantageous.

DE 10346206 A1 describes a contact surface for electrical contacts. In the silver layer shown, which was produced by galvanic processes, finely dispersed graphite particles are embedded. By incorporating graphite in the silver layer, a reduction in friction is achieved, resulting in lower insertion forces, improved corrosion protection and a longer service life of the contacts due to the increased wear protection. At the same time a good electrical contact is guaranteed.

DE 10 2008 030 988 B4 describes the electrochemical coating of a component, whereby the layer has a metallic structure and carbon nanotubes and a dry lubricant are incorporated in this layer. The installation of carbon nanotubes increases the electrical conductivity and the heat dissipation of the layer and by mixing it with other dry lubricants the layer can be optimised with regard to its wear behaviour for different applications.

DE 2543082 A1 discloses a silver electrolyte for the production of silver coatings, which also comprises graphite, brightener and wetting agent. The graphite must be kept in suspension by pumping the electrolyte containing bath during deposition.

In the state of the art, silver electrolytes are described which additionally comprise brighteners or other substances which improve deposition, such as xanthogenates, carbamates or turquoise red oil. Electrolyte solutions are also shown which require mechanical intervention to keep the solid components in suspension. Also described in the state of the art are electrolytes containing different solid components to obtain properties of deposited surfaces which are lost by complex additive systems.

A disadvantage of known silver electrolytes for the deposition of silver on surfaces is that they do not disperse the substances to be dispersed sufficiently evenly in the electrolyte, which on the one hand leads to an inhomogeneous distribution of the solid components in the deposited layers and on the other hand results in the fact that sometimes no deposition takes place at all. Also, some electrolytes are not suitable to disperse different types of solid components equally, so that pumping or stirring is necessary during the deposition, which has a negative effect on the homogeneity of the surfaces obtained. To overcome these disadvantages, complex additive systems are often used, which can have a negative effect on the deposited surfaces and also lead to increased costs.

Known electrolytes are not suitable for sufficiently dispersing further particles, especially dry lubricants, so that surfaces are obtained in which further substances such as additives are incorporated which have a negative influence on the dispersion layers produced. Among other things, this causes the inhomogeneity of known surfaces.

Another disadvantage is that up to now, combinations of solid components have often had to be used, such as carbon nanotubes and dry lubricants, in order to achieve the appropriate surface properties and to compensate for the disadvantages of the additive systems. This also leads to the fact that other substances negatively influence the homogeneity and also further increase the costs. Furthermore, additives that are supposed to improve the deposition, provide for a more complex and complicated process control and process monitoring.

Another disadvantage of known electrolytes is that the deposition temperature must be high to ensure sufficient deposition.

It is therefore the object of the invention to provide silver electrolytes which disperse solid components well and at the same time allow to dispense with complex additive systems in order to achieve a homogeneous deposition. A further object of the invention is to provide surfaces, in particular contact surfaces, which exhibit increased wear resistance and good electrical conductivity. It is also the object of the invention to provide a deposition process for the production of coated surfaces, especially contact surfaces, with improved durability.

Durability in this case means a reduction in the required insertion forces accompanied by an increase in the number of possible mating cycles, a reduction in cold welding, i.e. the welding of the soft silver layers due to micro-vibrations, and the maintenance of the best possible contact resistance over the longest possible period of time.

The object underlying the invention is solved by a silver electrolyte according to claim 1. Preferred embodiments of the silver electrolyte according to the invention are indicated in the sub-claims, which can be optionally combined with each other.

The subject matter of the invention is further a method for the deposition of a dispersion silver layer on a substrate according to claim 8. Preferred embodiments of the method according to the invention are indicated in the subclaims, which may optionally be combined with each other.

The invention further comprises a contact surface according to claim 12 below. Preferred embodiments of the contact surface according to the invention are indicated in the sub-claims, which can be optionally combined with each other.

The invention also relates to the use of the inventive contact surfaces for electrical contacts in plug connections according to the invention and the use of the dispersion silver electrolyte according to the invention for coating a substrate by means of strip application.

The silver electrolyte for the deposition of silver layers on substrates comprises according to invention
 a) Potassium silver cyanide,
 b) Potassium cyanide with a minimum content of 10 g/L,
 c) at least one grain refiner with a content of 0.2 to 10 g/L
 d) at least one dispersant with a content of 1 to 10 g/L and
 e) at least one solid component with a content of 1 to 150 g/L, where the particles of the solid component have an average particle size ($d_{50}$) of 10 nm-100 μm.

Surprisingly, it has been shown that with a silver electrolyte in the composition shown, different solid components can be homogeneously dispersed to obtain surfaces with a dispersion silver layer with increased durability and good electrical conductivity. The electrolyte according to the invention is characterised by the fact that a wide variety of dispersion silver layers can be produced with it. Depending on the type and quantity of solid components incorporated, these layers are characterised by their good contact resistance with an improved coefficient of friction or increased hardness. The durability of these layers, in terms of abrasion or rubbing through, exceeds that of simple silver layers. The electrolyte according to the invention is also particularly suitable for the use of solid components as substances to be dispersed. In addition, the electrolyte according to the invention produces silver layers with good conductivity, so that the addition of other substances such as carbon nanotubes is not necessary. Furthermore, the electrolyte according to the invention can be used both at low and high current densities. Thus, the electrolyte can be used for a wide range of applications and can, for example, be used in strip electroplating.

The solid components are homogeneously dispersed in the electrolyte according to the invention. The particularly homogeneous dispersion ensures the homogeneous incorporation of the solid components in the deposited silver layers. In addition, the use of the electrolyte according to the invention reduces the incorporation of additives, which regularly has a negative influence on homogeneity.

In addition, the electrolyte is suitable for use with different solid components, so that the surface properties can be adapted to different applications. A further advantage of the electrolyte according to the invention is that the layer thickness can be varied and adapted to the respective application.

"Substituted" in the sense of the invention means that a hydrogen atom on a hydrocarbon is replaced by another atom or group of atoms.

For the purpose of the invention, "solid component" means a component which is not present in solution but is present in the electrolyte as a solid and is also referred to as finely dispersed solid component in connection with the present dispersion silver layers.

For the purposes of the invention, the mean particle size ($d_{50}$) indicates that 50% of the particles of a solid component have a diameter smaller than the value indicated.

"Grain refiner" in the sense of the invention are substances which shift the grain size of silver deposition to smaller grain sizes.

"Dry lubricants" in the sense of the invention are substances which improve the sliding properties of a surface.

"Hard materials" in the sense of the invention are materials which are characterised by their particularly high hardness.

The silver electrolyte is a solution, preferably an aqueous solution. Other solvents may also be contained in the electrolyte.

Unless otherwise stated, all contents in g/L are referred to the total volume of electrolyte in the following.

In an advantageous embodiment, the content of potassium silver cyanide in the electrolyte is at least 10 g/L, preferably at least 25 g/L, more preferably at least 40 g/L and even more preferably at least 50 g/L.

Advantageous is the content of silver in the electrolyte at least 15 g/L, preferably at least 20 g/L, more preferably at least 25 g/L and even more preferably at least 27 g/L.

Preferably the content of silver in the electrolyte is between 1 and 100 g/L, preferably between 5 and 50 g/L and even more preferably between 10 and 30 g/L.

Preferably the content of potassium silver cyanide in the electrolyte is not more than 150 g/L, preferably not more than 125 g/L, more preferably not more than 100 g/L and even more preferably not more than 75 g/L.

The potassium cyanide content is preferably at least 20 g/L, preferably at least 50 g/L, more preferably at least 80 g/L, even more preferably at least 100 g/L, even more preferably at least 120 g/L and most preferably at least 140 g/L.

In an advantageous embodiment, the at least one grain refiner is selected from naphthalene sulphonic acid, naphthalene sulphonic acid derivatives or mixtures thereof.

The content of grain refiner is advantageous between 0.2 and 8 g/L, preferably between 0.3 and 6 g/L, more preferably between 0.4 and 5 g/L and even more preferably between 0.5 and 3 g/L.

The dispersant preferably comprises alkyl sulphates with $C_1$-$C_{25}$ alkyl radicals and preferably alkyl sulphates with $C_1$-$C_{20}$ alkyl radicals, which may be unsubstituted or optionally substituted. Preferably the dispersant comprises an alkyl sulphate with $C_1$-$C_{20}$ alkyl radicals, which may be unsubstituted or optionally substituted, and more preferably a sodium alkyl sulphate with $C_1$-$C_{20}$ alkyl radicals, which may be unsubstituted or optionally substituted. The alkyl radicals may be linear and/or branched.

Preferably the content of at least one dispersant is between 0.2 and 9 g/L, preferably between 0.3 and 8 g/L, more preferably between 0.4 and 7 g/L and even more preferably between 0.5 and 6 g/L.

The content of at least one solid component is preferably between 5 and 125 g/L, preferably between 10 and 100 g/L, more preferably between 15 and 90 g/L and even more preferably between 20 and 80 g/L.

Preferably the content of at least one solid component is at least 5 g/L, preferably at least 10 g/L, more preferably at least 15 g/L, even more preferably at least 20 g/L, even more preferably at least 30 g/L and most preferably at least 40 g/L.

In an advantageous embodiment, the particles of at least one solid component have an average particle size ($d_{50}$) of 50 nm to 75 μm, preferably 100 nm to 50 μm, more preferably 500 nm to 35 μm and even more preferably 1 μm to 20 μm. The diameters and thus also the mean particle size ($d_{50}$) of the solid components are determined by laser diffraction.

As solid components, all types of organic or inorganic particles can be considered.

Preferably the at least one solid component is a dry lubricant, a hard material or mixtures thereof, preferably a dry lubricant.

In an advantageous embodiment, the at least one solid component is selected from silicates, sulphides, carbides, nitrides, oxides, selenides, tellurides, organic and inorganic polymers and carbon modifications. For the purposes of the invention, carbon modifications in the present case include not only diamond, londsdaleite, fullerenes and graphite but also graphene, carbon nanotubes, carbon black, activated carbon, graphite fluoride, graphite oxide, graphite coated with $Al_2O_3$, non-graphitic and other forms of carbon.

According to an advantageous embodiment, the at least one solid component is selected from the group consisting of $MoS_2$, $WS_2$, $SnS_2$, $NbS_2$, $TaS_2$, graphite, graphite fluoride, graphite oxide, hexagonal boron nitride, silver niobium selenide, TiN, $Si_3N_4$, $TiB_2$, WC, TaC, $B_4C$, $Al_2O_3$, $ZrO_2$, cubic BN, diamond, $MoSe_2$, $WSe_2$, $TaSe_2$, $NbSe_2$, SiC, $Al_2O_3$ coated graphite, $Al_2O_3$ coated $MoS_2$ and $Al_2O_3$ coated $WS_2$ or mixtures thereof, preferably of $MoS_2$, $WS_2$, graphite, graphite oxide, hexagonal boron nitride or mixtures thereof, more preferably of graphite, graphite oxide, $MoS_2$, $WS_2$ or mixtures thereof and even more preferably graphite.

$Al_2O_3$ coated solid particles are produced by coating the solid particles by means of controlled hydrolysis of $Al(NO_3)_3 \cdot 9\ H_2O$ according to Huang & Xiong (2008) (Huang, Z.; Xiong, D. (2008): $MoS_2$ coated with A/203 for Ni—$MoS_2/Al_2O_3$ composite coatings by pulse electrodeposition. Surface & Coatings & Technology 202 (2008) 3208-3214).

According to an advantageous embodiment, the at least one solid component is selected from silicates, sulphides, carbides, nitrides, oxides, selenides, tellurides, organic and inorganic polymers. Preferably the at least one solid component is selected from the group consisting of $MoS_2$, $WS_2$, $SnS_2$, $NbS_2$, $TaS_2$, hexagonal boron nitride, silver niobium selenide, TIN, $Si_3N_4$, $TiB_2$, WC, TaC, $B_4C$, $Al_2O_3$, $ZrO_2$, cubic BN, $MoSe_2$, $WSe_2$, $TaSe_2$, $NbSe_2$, SiC, $Al_2O_3$ coated $MoS_2$ and $Al_2O_3$ coated $WS_2$ or mixtures thereof, preferably of $MoS_2$, $WS_2$, hexagonal boron nitride or mixtures thereof and more preferably of $MoS_2$, $WS_2$ or mixtures thereof.

According to another advantageous embodiment, at least one solid component is selected from carbon modifications. Preferably the at least one solid component is selected from the group consisting of graphite, graphite fluoride, graphite oxide, diamond, $Al_2O_3$-coated graphite or mixtures thereof, preferably graphite, graphite fluoride, graphite oxide, $Al_2O_3$-coated graphite or mixtures thereof, more preferably graphite, graphite oxide or mixtures thereof and even more preferably graphite.

Preferably the electrolyte comprises at least one more solid component. This at least one further solid component can also be selected from the above mentioned solid components.

Advantageously, the electrolyte can also comprise a brightener. A quantity of 1 to 1000 mg/L, preferably less than 50 mg/L, is usually used for this purpose. Examples of brighteners are phenylpropionic acid, phenylpropionic acid amide, triaminotriphenylmethane, 1-(p-aminophenyl)-3-methylpyrazole, stearamidopropyldimethyl-(β-hydroxyethyl) ammonium dihydrogen-phosphate, 1,5-diphenylcarbazide and chloralhydrate.

The silver electrolyte according to the invention can optionally comprise further additives such as stabilisers, dispersants and/or grain refiners to further improve the performance of the electrolyte and to enhance the properties of the deposited dispersion silver layer.

The above mentioned embodiments can also be combined.

A further subject matter of the invention is a process for depositing a dispersion silver layer on a substrate, comprising the steps
  a) Provision of a silver electrolyte according to the invention,
  b) introducing a substrate into the silver electrolyte, and
  c) Performing the deposit.

The method according to the invention comprises the deposition of a dispersion silver layer on a substrate from a silver electrolyte according to one of the above-described embodiments. The information given above about the inventive electrolyte is also valid for the method.

In the method according to the invention, all usual substrates used for the deposition of silver layers and dispersion silver layers can be used. In the method according to the invention, the substrate preferably comprises a metal or a metal alloy. The dispersion silver layer is then deposited on the metal or metal alloy. The metal or metal alloy may, for example, comprises or consists of copper and/or iron. Other intermediate layers of other metals such as nickel or silver may also be present. Such layers have various functions such as increasing the adhesion of the dispersion silver layer to the substrate, protection against corrosion, protection against diffusion or improvement of other physical properties.

Galvanic or external currentless processes can be used as deposition methods. Examples of galvanic processes are barrel, rack or strip electroplating.

The substrate is preferably cleaned before coating, preferably degreased. The substrate can be subjected to various pretreatment steps. Copper layers, nickel layers and/or further silver layers can be deposited.

Preferably the substrate is pre-silvered before step a). Preferably the substrate is nickel-plated before pre-silvering.

According to an advantageous embodiment, the temperature when carrying out the deposition in step c) is 1° C. to 50° C., preferably 5° C. to 40° C., more preferably 5° C. to 35° C., even more preferably 10° C. to 30° C., even more preferably 15° C. to 25° C., even more preferably 17° C. to 22° C. and most preferably 20° C.

In an advantageous embodiment, the current density in step c) is from 1.2 $A/dm^2$ to 35.0 $A/dm^2$, preferably from 1.5 $A/dm^2$ to 30.0 $A/dm^2$, more preferably from 2.0 $A/dm^2$ to 25.0 $A/dm^2$, even more preferably from 2.5 $A/dm^2$ to 25.0 $A/dm^2$ and even more preferably from 2.5 $A/dm^2$ to 20.0 $A/dm^2$.

According to an advantageous embodiment, the process is strip electroplating.

The duration of the deposition is to be selected according to the desired layer thickness to be achieved and the application of the strip electroplating Basically, the duration of the deposition is not limited.

Preferably the duration of the separation in step c) is from 0.1 min to 20 min, preferably from 0.15 min to 15 min and more preferably from 0.3 min to 10 min.

Preferably step a) is carried out before step b), step b) is followed by step c).

A further subject-matter of the invention relates to a contact surface, wherein according to the invention an electrochemically deposited dispersion silver layer is arranged on a substrate, and
wherein the dispersion silver layer comprises particles of at least one finely dispersed solid component with an average particle size ($d_{50}$) of 10 nm-100 µm.

The information given above about the electrolyte and the method according to the invention is also valid for the contact surface. The finely dispersed solid component can thus be selected from the solid components mentioned above. As substrates for the contact surfaces in accordance with the invention, all the above-mentioned substrates can be used.

The contact surfaces according to the invention allow only one contact partner to be equipped with a dispersion silver surface when a dry lubricant is used as the solid component. The other contact partner can consist of a conventional metal surface without solid content, especially dry lubricant content. In this way costs can be reduced. However, both contact partners can also be equipped with a dispersion silver surface.

The contact surfaces according to the invention are characterised by their advantageous wear resistance. In particular, the resistance of mating processes to wear caused by micro movements, so-called fretting, is significantly improved. Such micromovements occur, for example, in connectors in automobiles due to vibrations during operation of the vehicle. Wear due to micromovements can also occur due to temperature fluctuations.

Preferably the contact surface comprises at least one more solid component. Preferably the at least one further solid component is a dry lubricant or a hard material. Preferably the at least one further solid component selected from the solid components mentioned above for the electrolyte according to the invention, which are also valid for the contact surface.

In an advantageous embodiment, the particles of at least one finely dispersed solid component have an average particle size ($d_{50}$) of 50 nm to 75 µm, preferably 100 nm to 50 µm, more preferably 500 nm to 35 µm and even more preferably 1 µm to 20 µm. The same applies to particles of other solid constituents.

The content of at least one finely dispersed solid component in the dispersion silver layer can be varied by changing the separation conditions. In this way, the properties of the surface can be adjusted in terms of contact resistance and wear resistance.

Preferably the dispersion silver layer comprises the at least one finely dispersed solid component in a quantity ranging from 0.5 to 30 wt. %, preferably from 1.0 to 25 wt. %, more preferably from 1.3 to 20 wt. %, even more preferably from 1.5 to 15 wt. %, even more preferably 2.0 to 10 wt. % and even more preferably from 3.1 wt. % to 10 wt. % based on the total weight of the dispersion silver layer.

Preferably, the silver dispersion layer comprises the at least one finely dispersed solid component in an amount of at least 3.0 wt. %, preferably at least 3.1 wt. %, more preferably at least 3.2 wt. %, even more preferably at least 3.3 wt. % and even more preferably at least 3.5 wt. % based on the total weight of the dispersion silver layer.

Preferably the at least one finely dispersed solid component selected from silicates, sulphides, carbides, nitrides, oxides, selenides, tellurides, organic and inorganic polymers and carbon modifications.

According to an advantageous embodiment of the contact surface, the at least one finely dispersed solid component is selected from silicates, sulphides, carbides, nitrides, oxides, selenides, tellurides, organic and inorganic polymers. Preferably the at least one finely dispersed solid component is selected from the group consisting of $MoS_2$, $WS_2$, $SnS_2$, $NbS_2$, $TaS_2$, hexagonal boron nitride, silver niobium selenide, TIN, $Si_3N_4$, $TiB_2$, WC, TaC, $B_4C$, $Al_2O_3$, $ZrO_2$, cubic BN, $MoSe_2$, $WSe_2$, $TaSe_2$, $NbSe_2$, SiC, $Al_2O_3$ coated $MoS_2$ and $Al_2O_3$ coated $WS_2$ or mixtures thereof, preferably of $MoS_2$, $WS_2$, hexagonal boron nitride or mixtures thereof and more preferably of $MoS_2$, $WS_2$ or mixtures thereof.

According to another advantageous embodiment of the contact surface, the at least one finely dispersed solid component is selected from carbon modifications. Preferably the at least one finely dispersed solid component is selected from the group consisting of graphite, graphite fluoride, graphite oxide, diamond, $Al_2O_3$ coated graphite or mixtures thereof, preferably graphite, graphite fluoride, graphite oxide, $Al_2O_3$ coated graphite or mixtures thereof, more preferably graphite, graphite oxide or mixtures thereof and even more preferably graphite.

According to another advantageous embodiment, the at least one finely dispersed solid component is selected from the group consisting of $MoS_2$, $WS_2$, $SnS_2$, graphite, graphite oxide, graphite fluoride, hexagonal boron nitride, silver niobium selenide, SiC, $Al_2O_3$ coated graphite, $Al_2O_3$ coated $MoS_2$ and $Al_2O_3$ coated $WS_2$ or mixtures thereof, preferably $MoS_2$, $WS_2$, graphite and hexagonal boron nitride or mixtures thereof.

In a further embodiment of the contact surface, the at least one finely dispersed solid component is selected from graphite, $MoS_2$, $WS_2$ or mixtures thereof, preferably graphite, and the dispersion silver layer comprises the at least one finely dispersed solid component in an amount of at least 3.0 wt. %, preferably at least 3.1 wt. %, more preferably at least 3.2 wt. %, even more preferably at least 3.3 wt. % and even more preferably at least 3.5 wt. % based on the total weight of the dispersion silver layer.

Preferably the dispersion silver layer has a coefficient of friction u at 0.3 N after 100 cycles of less than 1.4, preferably less than 1.2, more preferably less than 1.0, even more preferably less than 0.8, even more preferably less than 0.6 and even more preferably of 0.4.

Preferably the electrical contact resistance at 1.0 N after 100 cycles is less than 1.0 mΩ, preferably less than 0.8 mΩ, more preferably less than 0.75 mΩ, even more preferably less than 0.7 mΩ and even more preferably less than 0.65 mΩ.

Preferably the dispersion silver layer has a coefficient of friction u at 1.0 N after 100 cycles of less than 1.0, preferably less than 0.8, more preferably less than 0.6, even more preferably less than 0.5 and even more preferably less than 0.45.

Preferably, the thickness of the deposited dispersion silver layer is between 0.5 µm to 200 µm, preferably 1 µm to 100 µm, especially preferably 1.1 µm to 25 µm.

Advantageous, the contact surface is a microrough surface. The micro-roughness has a positive effect on the tribological and electrical properties.

Preferably, the contact surface has a micro-roughness, described hereinafter by the average roughness Ra, of at least 0.05 µm, preferably at least 0.1 µm, more preferably at least 0.2 µm and even more preferably at least 0.3 µm.

Preferably, the contact surface has a micro-roughness, described hereinafter by the average roughness Ra, in the range of 0.05 µm to 20 µm, preferably from 0.1 µm to 10 µm, more preferably from 0.2 µm to 6 µm and even more preferably from 0.3 µm to 5 µm.

Preferably the contact surfaces have a fretting life according to Song at 1.0 N of more than 7500 cycles, preferably more than 10,000 cycles, more preferably more than 15,000 cycles, even more preferably more than 20,000 cycles and even more preferably more than 25,000 cycles.

The aforementioned contact surfaces can be produced by means of the above described method according to the invention. Thus the invention also comprises a contact surface obtainable by the method according to the invention, wherein an electrochemically deposited dispersion silver layer is arranged on a substrate, and wherein the dispersion silver layer comprises particles of at least one finely dispersed solid component with an average particle size ($d_{50}$) of 10 nm-100 μm.

The above described information on the electrolyte according to the invention, the method according to the invention and the contact surfaces according to the invention are also valid for the contact surfaces obtained by means of the method according to the invention. The finely dispersed solid component can thus be selected from the solid components mentioned above. As substrates for the contact surfaces in accordance with the invention, all the above-mentioned substrates can be used.

A further subject-matter of the invention relates to the use of the contact surface for electrical contacts in plug connections.

A further subject-matter of the invention concerns the use of the dispersion silver electrolyte according to the invention for coating a substrate by means of strip application.

Further advantages of the invention result from the following description of preferred embodiment examples, which are however in no way to be understood as restrictive. All embodiments of the invention can be combined within the scope of the invention.

EMBODIMENTS

Materials

For the tests, copper sheets (material: CuFe2P) from Wieland-Werke AG were used. The average roughness Ra of the uncoated sheets is 0.47 μm.

KCN was purchased from Bücherl and K [Ag(CN) 2] was purchased from Umicore.

SLOTOSIL SG 1911 and SLOTOSIL SG 1912 are additives for silver electrolytes based on KCN/potassium silver cyanide for the dispersion separation of the company Dr.-Ing. Max Schlotter GmbH & Co. KG. SLOTOSIL SG 1911 comprises a naphthalene sulphonic acid derivative as grain refining additive. SLOTOSIL SG 1912 comprises an alkyl sulfate as dispersion stabilizing additive.

CUPRUM 11, a brightener, CUPRUM 12, a wetting agent, and the anti-tarnish concentrate AG 111 were purchased by Dr.-Ing. Max Schlotter GmbH & Co KG.

The graphite particles used come from Graphit Kropfmühl AG. The graphite powder used of the UF2 grade has a mean particle size of $d_{50}$=4.5 μm Measurement Methods Determination of Solid Content The solid content (in weight %) was determined by energy dispersive X-ray spectroscopy (EDX). For this purpose, measurements on the deposited thin films were carried out with an X-Flash Detector 410-M (Bruker AXS Microanalysis GmbH), which was mounted in a JSM-6610 LV electron microscope (manufacturer: JEOL) with an excitation voltage of 25 KV. The measurements were evaluated with the program Esprit (Bruker).

Determination of the Diameter of the Solid Components ($d_{50}$)

The diameters of the particles of the solid components in the form of the average particle size $d_{50}$ were determined by laser diffraction with a Helos instrument from Sympatec.

Measurement of Micro Roughness (as Centre Roughness Ra)

The microroughness (as mean roughness Ra) was determined by means of an optical measuring method with a VK-X100 confocal 3D laser scanning microscope (manufacturer: Keyence Corporation) and subsequent evaluation with the Multi file analyzer program (Keyence Corporation).

Coating Copper Sheets

Electroplating

Samples were coated with dispersion silver layers to obtain contact surfaces. The copper sheets were first copper-plated, then pre-silvered and finally coated with a dispersion silver layer.

Between each step was rinsed thoroughly with water.

The galvanisation of the copper sheets included the following steps:

1, and 2. step: degreasing of the substrates according to known methods; first alkaline degreasing step at 60° C. for 1 min with ultrasonic support. Second alkaline electrolytic degreasing step at room temperature (25° C.) for a treatment time of 2 to 3 min.

3. step: Etching of copper with bath of sulphuric acid, complexing agent-free copper activation. The activation is applied at room temperature (25° C.) for 0.5 min.

4. step: Treatment with bright copper bath, which was a cyanide electrolyte to deposit bright surfaces. The electrolyte, consisting of 10 g/l KOH, 115 g/l KCN, 64 g/l CuCN and 1.5 ml/l brightener CUPRUM 11; 2.5 ml/l base additive CUPRUM 12 was operated at 60° C. The electrolyte was used with 2 A/dm².

5. step: The pre-silvering was carried out in a pre-silvering bath with a cyanide electrolyte with low silver content (120 g/l KCN; 3.7 g/l K [Ag(CN) 2]). The pre-silver plating was operated at room temperature (25° C.). As cathodic current density 2 A/dm² was chosen.

6. step: Deposition of the dispersion silver layers

The sheets pre-treated according to the procedure described above were mounted on A rotary cell for coating. The electrolyte had the following composition:

| | |
|---|---|
| KCN: | 154 g/L |
| K[Ag(CN)$_2$]: | 56 g/L |
| SLOTOSIL SG 1911: | 20 mL/L |
| SLOTOSIL SG 1912: | 20 mL/L |
| Graphite UF2: | 70 g/L |

The sheets were coated at different rotation speeds to simulate a belt speed of 30 m/min, 60 m/min and 100 m/min. The deposition was performed at a current density of 2.5 A/dm² 5 A/dm², 10A/dm², 15A/dm² and 20A/dm² respectively. Detailed information on the individual tests is listed in Table 1.

7. step: Antitarnish aftertreatment; The antitarnish, 160 ml/l Antitarnish Concentrate AG 111, was applied at 50° C. and pH 5.3. The coated test specimens were immersed in the anti-tarnish for 2 min. Afterwards they were rinsed with deionised water and dried.

Table 1 shows the results of the characterisation of the deposited dispersion silver layers. The graphite contents of the graphite-containing silver layers were determined by EDX.

TABLE 1

Results strip electroplating

| Examples | Speed (m/min) | Current density (A/dm$^2$) | Duration of coating (min) | Electrolyte temperature (° C.) | Graphite content EDX (weight %) | average roughness Ra (µm) |
|---|---|---|---|---|---|---|
| 1 | 100 | 2.5 | 8 | 21 | 1.76 | 1.38 |
| 2 | 60 | 2.5 | 8 | 21 | 3.13 | 2.26 |
| 3 | 30 | 2.5 | 8 | 21 | 4.98 | 2.51 |
| 4 | 100 | 5 | 4 | 21 | 1.69 | 1.09 |
| 5 | 60 | 5 | 4 | 22 | 3.73 | 2.95 |
| 6 | 30 | 5 | 4 | 22 | 6.39 | 2.43 |
| 7 | 100 | 10 | 2 | 22 | 1.33 | 1.00 |
| 8 | 60 | 10 | 2 | 22 | 6.45 | 3.66 |
| 9 | 30 | 10 | 2 | 22 | 8.32 | 4.39 |
| 10 | 100 | 15 | 1.5 | 22 | 2.23 | 1.08 |
| 11 | 60 | 15 | 1.5 | 22 | 6.36 | 4.90 |
| 12 | 30 | 15 | 1.5 | 22 | 8.69 | 6.33 |
| 13 | 100 | 20 | 1 | 23 | 2.05 | 1.00 |
| 14 | 60 | 20 | 1 | 23 | 7.54 | 4.85 |
| 15 | 30 | 20 | 1 | 23 | 7.63 | 16.03 |

The results presented in Table 1 show the electrolyte according to the invention is suitable for the deposition of dispersion silver layers. In comparison, electrolytes known from the state of the, which are used for the production of dispersion silver layers, the achievable particle contents are much higher, which is a significant improvement.

In contrast to known electrolytes used for the production of dispersion silver layers, the electrolyte according to the invention is especially suitable for the deposition of dispersion silver layers by means of the reel-to-reel process.

By incorporating solid components, especially a dry lubricant into the dispersion silver layer, dispersion silver layers are obtained with considerably better sliding properties compared to pure silver layers especially at high concentrations solid components. A high concentration of solid particles in the layer is especially advantageous for wear caused by micro-vibrations (fretting). In the case of small contact points, high solid particle concentrations increase the probability that a sufficient amount of solid particles is present in the contact area to reduce wear. This property is particularly important for contact surfaces of connectors and, as the examples show, is achieved with the method according to the invention.

The invention claimed is:

1. A silver electrolyte for the deposition of silver layers on substrates comprising
    a) potassium silver cyanide with a content of at least 50 g/L,
    b) potassium cyanide with a content of at least 100 g/L,
    c) at least one grain refiner with a content of 0.2 to 10 g/L,
    d) at least one dispersant with a content of 1 to 10 g/L, and
    e) at least one solid component with a content of 1 to 150 g/L,
    wherein particles of the solid component have an average particle size ($d_{50}$) of 10 nm-100 µm; and
    wherein the at least one grain refiner is selected from naphthalene sulphonic acid, naphthalene sulphonic acid derivatives or mixtures thereof;
    wherein the at least one dispersant comprises alkyl sulfates having $C_1$-$C_8$ alkyl groups which may be unsubstituted or optionally substituted; and
    wherein the at least one solid component is graphite.

2. The silver electrolyte according to claim 1, wherein the particles of the at least one solid component have an average particle size ($d_{50}$) of 1 µm to 20 µm.

3. The silver electrolyte according to claim 1, wherein a ratio of potassium cyanide to potassium silver cyanide is at least 2.75.

4. A silver electrolyte, consisting of:
    a) potassium silver cyanide with a content of at least 50 g/L,
    b) potassium cyanide with a content of at least 120 g/L,
    c) at least one grain refiner with a content of 0.2 to 10 g/L,
    d) at least one dispersant with a content of 1 to 10 g/L,
    e) at least one solid component with a content of 1 to 150 g/L, and
    f) a brightener, and
    g) one or more solvents;
    wherein particles of the solid component have an average particle size ($d_{50}$) of 10 nm-100 µm;
    wherein the at least one grain refiner is selected from naphthalene sulphonic acid, naphthalene sulphonic acid derivatives or mixtures thereof;
    wherein the dispersant is 2-ethylhexyl sulfate; and
    wherein the at least one solid component is graphite.

5. A silver electrolyte, comprising:
    a) potassium silver cyanide with a content of at least 50 g/L,
    b) potassium cyanide with a content of at least 120 g/L,
    c) at least one grain refiner with a content of 0.2 to 10 g/L,
    d) at least one dispersant with a content of 1 to 10 g/L,
    e) at least one solid component with a content of 1 to 150 g/L, and
    f) a brightener, and
    g) one or more solvents;
    wherein particles of the solid component have an average particle size ($d_{50}$) of 10 nm-100 µm;
    wherein the at least one grain refiner is selected from naphthalene sulphonic acid, naphthalene sulphonic acid derivatives or mixtures thereof;
    wherein the dispersant is 2-ethylhexyl sulfate; and
    wherein the at least one solid component is graphite.

6. A method of depositing a dispersion silver layer on a substrate comprising the steps of:
    a) providing a silver electrolyte according to claim 1,
    b) introducing a substrate into the silver electrolyte, and
    c) performing the deposit.

7. The method according to claim 6, wherein a temperature in step c) is 15° C. to 30° C.

8. The method according to claim 6, wherein a current density in step c) is from 2.0 A/dm$^2$ to 25.0 A/dm$^2$.

9. The method according to claim 6, wherein a current density in step c) is from 2.5 A/dm$^2$ to 20.0 A/dm$^2$.

10. The method according to claim 6, wherein step c) is performed by strip electroplating.

11. A method for using a silver electrolyte according to claim 1, comprising coating a substrate with the silver electrolyte by strip application.

* * * * *